United States Patent [19]

Tanaka et al.

[11] Patent Number: 5,274,512
[45] Date of Patent: Dec. 28, 1993

[54] COEFFICIENT CONTROL SYSTEM FOR DIGITAL EQUALIZER USING ORTHOGONAL OSCILLATION

[75] Inventors: Masato Tanaka; Toshiya Kan, both of Tokyo, Japan

[73] Assignee: Sony Corporation, Tokyo, Japan

[21] Appl. No.: 828,524

[22] Filed: Jan. 27, 1992

Related U.S. Application Data

[62] Division of Ser. No. 492,116, Mar. 13, 1990.

[30] Foreign Application Priority Data

Mar. 13, 1989 [JP] Japan .................................. 1-60416
Sep. 13, 1989 [JP] Japan .................................. 1-237492
Sep. 19, 1989 [JP] Japan .................................. 1-240729

[51] Int. Cl.$^5$ .................. G11B 5/035; G11B 5/09; H03G 11/04; H03H 7/30
[52] U.S. Cl. ........................... 360/65; 360/32; 333/18; 333/28 R; 375/14
[58] Field of Search ................ 360/31, 46, 32, 65, 360/53; 333/18, 28 R; 375/11, 12, 14

[56] References Cited

U.S. PATENT DOCUMENTS

| | | | |
|---|---|---|---|
| 3,715,665 | 2/1973 | Chang | 328/155 |
| 4,590,524 | 5/1986 | Okamoto et al. | 360/65 |
| 4,928,287 | 5/1990 | Tanaka | 360/65 |

FOREIGN PATENT DOCUMENTS

| | | |
|---|---|---|
| 147550 | 7/1985 | European Pat. Off. . |
| 332079 | 9/1989 | European Pat. Off. . |
| 63-177363 | 7/1988 | Japan . |

OTHER PUBLICATIONS

Patent Abstracts of Japan, vol. 12, No. 456 (P-793) [3303] Nov. 30, 1988.
Publication IEEE Transactions on Magnetic, vo. Mag-23, No. 5 (Mita et al.) Sep., 1987.
IEEE Transactions on Communications, COM-33, No. 10 (Cohno et al.) Oct., 1985.
SMPTE Journal 96, No. 10, (Dare et al.) Oct., 1987.

Primary Examiner—Donald Hajec
Assistant Examiner—Won Tae C. Kim
Attorney, Agent, or Firm—Lewis H. Eslinger; Jay H. Maioli

[57] ABSTRACT

An automatic equalizer for use with a recording and/or reproducing apparatus or with a communication transmission channel, wherein equalizer parameters are rendered variable and the degree of change of the error rate is extracted to set the parameters to optimum values based on the degree of change of the error rate. Output signal error rates are sequentially detected at a plurality of measurement points corresponding to preset plural characteristic parameters to find a minimum error rate measurement point. An initial parameter setting operation is performed for providing characteristic parameters for this measurement point to the equalizer as the initial parameter.

2 Claims, 9 Drawing Sheets

COEFFICIENT CONTROL SYSTEM FOR DIGITAL EQUALIZER USING ORTHOGONAL OSCILLATION

This is a division of application Ser. No. 07/492,116, filed Mar. 13, 1990.

BACKGROUND OF THE INVENTION

This invention relates generally to an equalizer employed in a recording and/or reproducing apparatus or in a communication transmission channel and, more particularly, to an automatic equalizer in which parameters may be automatically set to optimum values.

In general, in a recording and/or reproducing apparatus or in a transmission channel for a communication system, it is known to use an equalizer to equalize the transmission characteristics for diminishing distortion occurring in the transmission of analog signals or minimizing errors in the transmission of digital data. In magnetic recording and/or reproducing apparatus, such as audio or video tape recorders, equalizers are used for enhancing high-frequency characteristics to permit increasing the recording density of the magnetic tape in the recording system.

Conventionally, the operational characteristics of the equalizer are adjusted and fixed at the optimum values at the time of shipment of the particular piece of electronic apparatus.

In a rotary head type video tape recorder or digital audio tape recorder, a system is known for recording neighboring tracks with different recording azimuth angles, thereby eliminating the requirement for a guard band between adjacent tracks. This is the so-called inclined azimuth recording that is employed for realizing higher recording densities on the tape. In a video tape recorder or a digital audio tape recorder employing such inclined azimuth recording system, a tracking servo is usually applied for signal reproduction. There has been proposed, however, in Japanese Patent Publication No. 59-177712 (1984), a signal reproducing apparatus in which reproduction is performed without using tracking servo control. With such signal reproducing apparatus, first and second inclined tracks $TR_A$, $TR_B$ are alternately formed at different recording azimuth angles on a magnetic tape 1.

In order to reproduce these tracks, a rotational magnetic head device, as shown in FIG. 2, is employed in which first and second playback rotary magnetic heads 2A, 2B having azimuth angles corresponding to the recording azimuth are mounted at an angular interval of 180° on a tape guide drum 2. Each track of the magnetic tape 1 placed on the tape guide drum 2 over an angular extent of 180° is alternatively traced a plural number of times, for example twice, by first and second playback rotational magnetic heads 2A, 2B.

As shown in FIG. 3, the playback signals obtained by the rotary playback magnetic heads 2A, 2B are supplied from a head changeover switch 3 via a playback amplifier 4 and an equalizer 5 to a signal processing unit 6. The reproduced signals, represented in FIG. 4, are produced at an angular interval of 180° from the magnetic heads 2A, 2B by changeover of head operating switch 3 so as to be processed by signal processing unit 6 to form correct playback signals, which are then output at a signal output terminal 7.

As is well known, in magnetic recording and/or reproducing apparatus the frequency characteristics of the playback system are caused to vary by many factors, such as fluctuations in the magnetic recording media or magnetic heads, changes in temperature or humidity, or timing changes.

Hence, sufficient operational reliability cannot be obtained with the use of a conventional equalizer that has fixed equalizer characteristics. On the other hand, providing an allowance in the equalizer characteristics for adjustment to take into account fluctuations in the playback system usually results in the lowering of the recording density by an amount corresponding to such preset allowance.

Furthermore, with a signal reproducing apparatus in which signal reproduction is performed without a tracking servo, each track on the magnetic tape is traced alternately by the first and second playback magnetic heads 2A, 2B over its complete length, so that each track corresponds to two tracings. In other words, the track-tracing relation is the same for every other head tracing but differs for two consecutive head tracings.

Thus, in the reproducing apparatus in which signal reproduction is performed without tracking control, equalizing characteristics for odd-numbered track tracings must be measured and set independently from those for even-numbered tracings. As might be expected, in order to implement equalization, the overall system cannot but be complicated.

OBJECTS AND SUMMARY OF THE INVENTION

Accordingly, it is an object of the present invention to provide an improved automatic equalizer that can eliminate the above-noted defects inherent in previously proposed systems.

Another object of this invention is to provide an automatic equalizer in which the characteristic parameters can be efficiently and reliably converged into optimum values to afford optimum equalizer characteristics to the input signal.

It is a further object of the present invention to provide a signal reproducing apparatus adapted to reproduce signals without use of a tracking servo, wherein automatic setting of the equalizing characteristics can be realized by a simplified arrangement over previously proposed systems.

It is a still further object of the present invention to provide a signal reproducing apparatus having an automatic equalizing function for efficiently extracting changes caused in the characteristic parameters of the equalizer between odd-number track tracings and even-number track tracings.

According to an aspect of the present invention an automatic equalizer is provided in which the equalizer parameters are variable in response to the extent of change in the error rate of the output signal being equalized. The output signal error rates are sequentially detected at a number of measurement points that correspond to preset characteristic parameters in order to determine a minimum error rate measurement point. The characteristic parameters are finally determined by a process in which the parameters of the equalizer are varied in an orthogonal relationship that is independent of any head sequence involved in the reproduction of the signal being equalized. The orthogonal variation process involves making minute changes within a predetermined range and varying the characteristic parameters of the equalizer in a direction to diminish the signal error rate of the output signal on the basis of the detected degree of change of the signal error rate.

The above and other objects, features, and advantages of the present invention will become apparent upon reading the following description in conjunction with the accompanying drawings, in which the novel matter is pointed out in the claims.

DETAILED DESCRIPTION OF PREFERRED EMBODIMENTS

Figure 5:
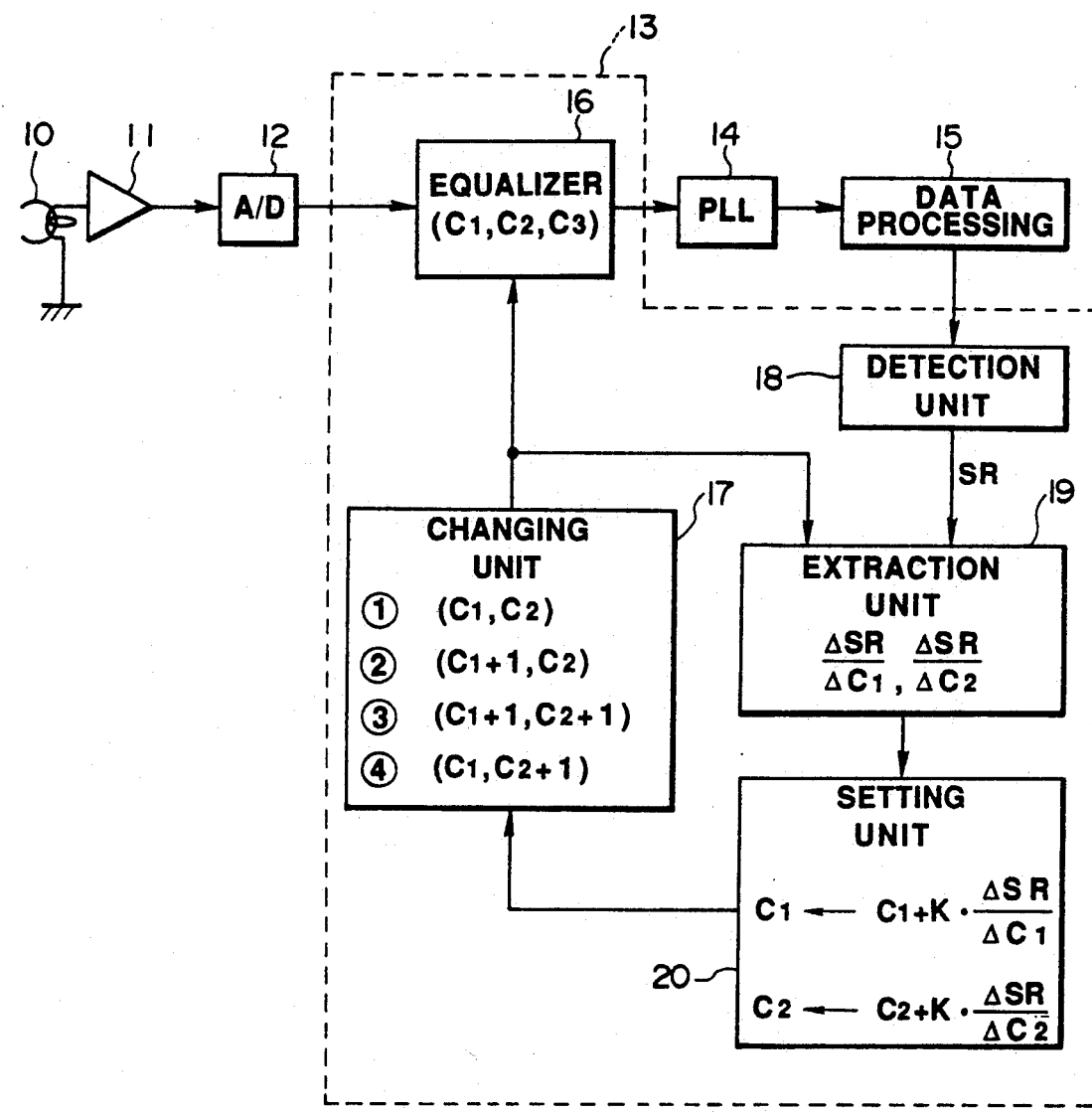
FIG. 5 is a schematic in block diagram form of an automatic equalizer according to an embodiment of the present invention.

FIG. 5 represents an application of the automatic equalizer of the present invention to a transmission circuit or a playback circuit of a recording and/or reproducing apparatus. In FIG. 5, RF signals reproduced from a magnetic recording medium (not shown) by a playback head 10 are transmitted through an amplifier 11 to an analog-to-digital (A/D) converter 12 where they are converted into digital signals and transmitted to an automatic equalizer 13. Equalized digital signals are output from automatic equalizer 13 and transmitted to a data processing circuit 15 by way of a phase locked loop (PLL) circuit 14.

Automatic equalizer 13 comprises an equalizer 16 interposed between A/D converter 12 and PLL circuit 14 and a parameter changing unit 17, a detection unit 18, an extraction unit 19, and a setting unit 20 for setting parameters of equalizer 16.

Equalizer 16 is comprised of a finite impulse response (FIR) type digital filter having its characteristics controlled by three parameters $C_1$, $C_2$, and $C_3$, and affords equalizing characteristics consistent with the parameters $C_1$, $C_2$, and $C_3$ to input digital signals supplied from A/D converter 12 and transmits the resulting signals to PLL circuit 14.

Figure 6:
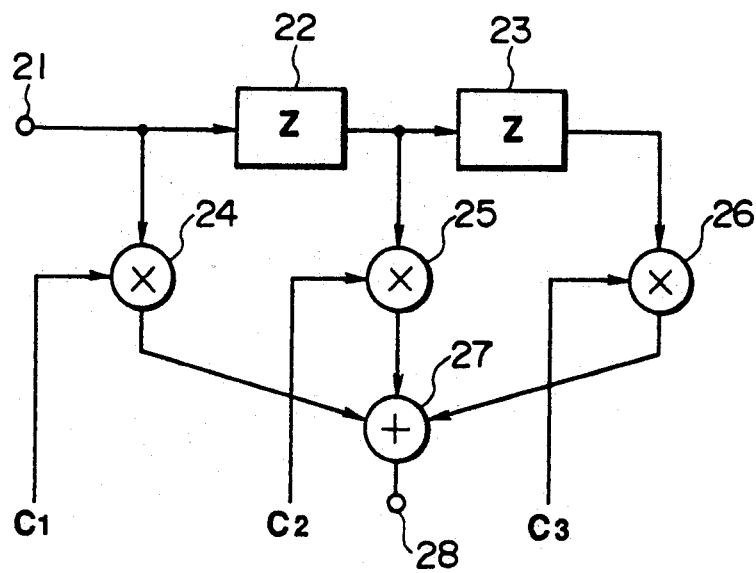
FIG. 6 is a schematic in block diagram form of an embodiment of the equalizer employed in the circuit of FIG. 5.

Equalizer 16 may be constructed as shown in FIG. 6, wherein a digital signal fed in at input terminal 21 is supplied to a first multiplier 24 and to a delay element 22. The output of delay element 22 is fed to a second delay element 23 and also to a second multiplier 25. The output of delay element 23 is fed to a third multiplier 26. In multipliers 24, 25, and 26 the signals are weighted in accordance with the parameters $C_1$, $C_2$, and $C_3$ input thereto and summed at a summing point 27 before being output at an output terminal 28.

In the above-described automatic equalizer 13, of the parameters $C_1$, $C_2$, and $C_3$ determining the characteristics of equalizer 16 the parameter $C_3$ is always fixed at a predetermined level, whereas the parameters $C_1$ and $C_2$ are variable. These parameters $C_1$ and $C_2$ are changed in dependence upon the output from parameter changing unit 17.

Figure 7:
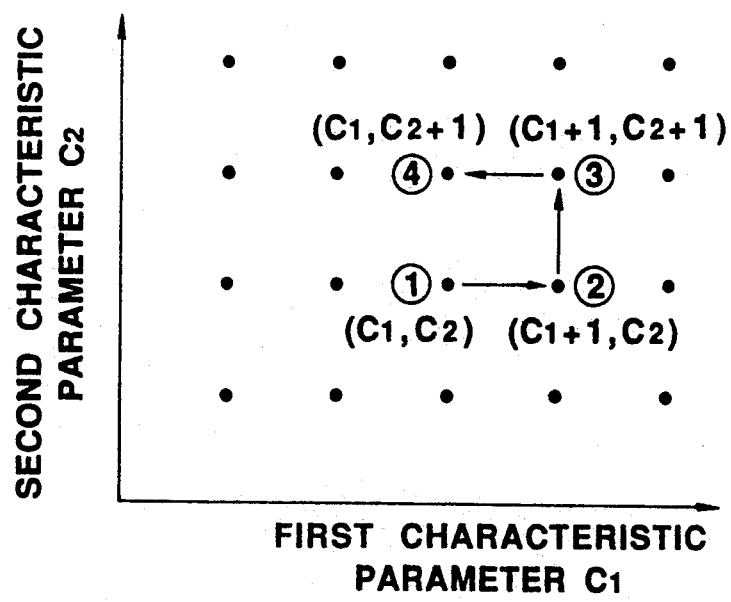
FIG. 7 graphically illustrates the state of change of the equalizer parameters.

Parameter changing unit 17 operates to change the parameters $C_1$ and $C_2$, as set in parameter setting unit 20 in a manner to be explained subsequently, for a predetermined small extent and within a predetermined short interval of time. The changed parameters are then supplied as parameters $C_1$ and $C_2$ to equalizer 16. In order to change parameters $C_1$ and $C_2$ the parameter $(C_1, C_2)$ value set by parameter setting unit 20, hereinafter referred to as value (i), is changed to $(C_1+1, C_2)$, hereinafter referred to as value (ii), then to $(C_1+1, C_2+1)$, hereinafter referred to as value (iii), and then to $(C_1, C_2+1)$, hereinafter referred to as value (iv). These sequential parameter changes are graphically shown on a Cl by C2 coordinate system in FIG. 7. The parameters are repeatedly cycled through the range of values (i) to (iv) in a fashion known as orthogonal oscillation by a predetermined amount around the value (i) to effect high-speed operation.

When supplied with the values (i) to (iv) as parameters $C_1$ and $C_2$, equalizer 16 performs a corresponding equalizing operation on the digital signal before transmitting the signal via PLL circuit 14 to data processing circuit 15 for output. A portion of the digital signal transmitted to data processing circuit 15 is retransmitted to detection unit 18 of automatic equalizer 13.

Detection unit 18 detects the error rate of the digital signal from data processing circuit 15 to form a data signal SR indicating the detected error rate. Data signal SR is fed to extraction unit 19, which is also supplied with the data indicating the values (i) to (iv) from parameter changing unit 17. Extraction unit 19 then fetches the error rate data SR from the values (i) to (iv) to detect the error rates SR(i) to SR(iv) for the respective values (i) to (iv). From these results, the ratio of change of the error rate to the variance in the parameter $C_1$, or $\Delta SR/\Delta C_1$, is extracted by solving the following equation:

$$(\Delta SR/\Delta C_1) = \{(SR(\text{ii}) + SR(\text{iii})) - (SR(\text{i}) + SR(\text{iii}))\}/2 \quad (1)$$

While the ratio of change of the error rate to the variance of the parameter $C_2$, or $\Delta SR/\Delta C_2$, is extracted by solving the following equation:

$$(\Delta SR/\Delta C_2) = \{(SR(\text{iii}) + SR(\text{iv})) - (SR(\text{i}) + SR(\text{ii}))\}/2 \quad (2)$$

The data corresponding to these change ratios are supplied to parameter setting unit 20, which adds a correction value $K\Delta SR/\Delta C_1$ to the preceding value $C_1$ in accordance with an equation:

$$C_1 = C_1 + K(\Delta SR/\Delta C_1) \quad (3)$$

where K is a constant, to compute a new value of parameter $C_1$ for equalizer 16 so as to diminish the error rate, while adding a correction value $K.\Delta SR/\Delta C_2$ to the preceding value $C_2$ in accordance with an equation:

$$C_2 = C_2 + K(\Delta SR/\Delta C_2) \quad (4)$$

where K is a constant, to compute a new value of the parameter $C_2$ for equalizer 16 acting to diminish the error rate. The operation of computing new values for the parameters $C_1$ and $C_2$ need not be linear but may be nonlinear, with the condition only that satisfactory equalizing characteristics be produced.

The new values of the parameters $C_1$ and $C_2$ thus set are applied to parameter changing unit 17, which changes the new parameters $C_1$ and $C_2$ as described above to transmit the new values to equalizer 16.

The above sequence of operations is repeated by units 16 through 20 in automatic equalizer 13 to change the parameters $C_1$ and $C_2$ automatically for reducing the output error rate of equalizer 16. Ultimately, automatic setting is made to minimize the error rate, that is, to optimize the parameters $C_1$ and $C_2$ for equalizer 16.

In addition, since the parameters $C_1$ and $C_2$ of equalizer 16 included in automatic equalizer 13 are set in accordance with the extent of change of the error rate, as described above, automatic equalizer 13 may be implemented with a relatively simple circuit organization, so that the overall system may be reduced in size and cost. Moreover, because the parameters $C_1$ and $C_2$ of equalizer 16 can be computed by a simplified operation, optimum values of the parameters may be converged upon at a higher speed.

Although the automatic equalizer 13 operating on a digital signal has been explained in the foregoing, an automatic equalizer operating on an analog signal may also be implemented in keeping with the present invention by detecting the error rate at the output of an analog equalizer, for example, and by subsequent conversion and digital signal processing.

With the above-described first embodiment of the present invention, the equalizer parameters may be automatically set to optimum values so as to follow fluctuations in characteristics caused by changes in the environment and to automatically cope with temporal changes in the circuitry, as well as fluctuations or changes in the recording medium. In this manner, with the use of the above-described automatic equalizer, a system can be implemented that is excellent both in interchangeability and in operational reliability.

As described above, equalizer parameters are set as a function of the degree of change in the error rate, so that the circuit construction may be simplified to reduce both size and cost. Moreover, the equalizer parameters are computed by a simplified operation, so that convergence to optimum values of the parameters may be achieved within a shorter period of time. Above all, the optimum parameters may be set quickly by employing the parameter changing method of orthogonally oscillating parameters.

Figure 8:
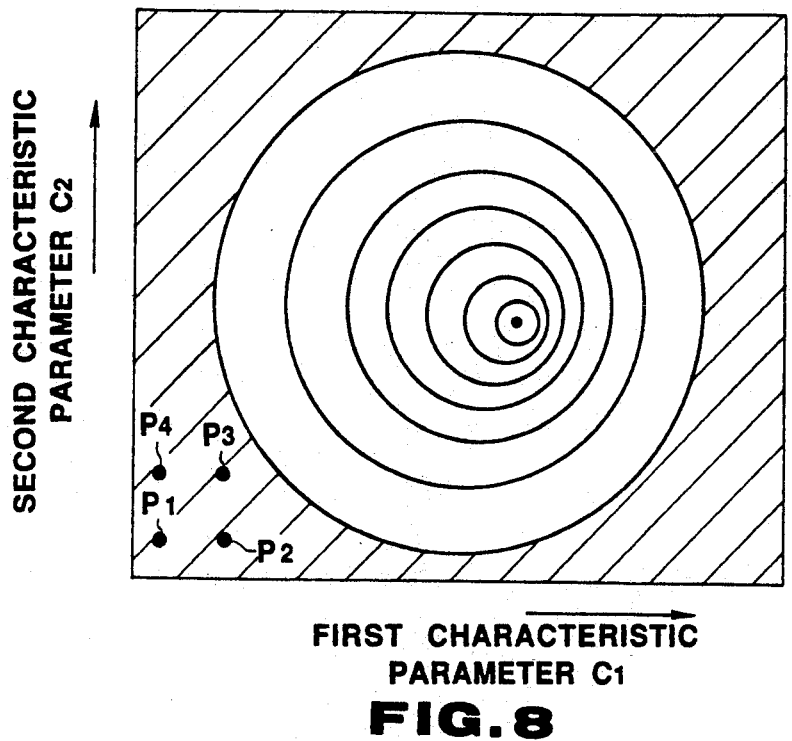
FIG. 8 graphically illustrates characteristic parameters useful in explaining the problems inherent in the automatic equalizer.

Nevertheless, with the above-described first embodiment of automatic equalizer 16 prolonged convergence time is necessitated when the initial value of the equalizer parameter is markedly different from the convergence value. On the other hand, assuming in a multidimensional space that can be occupied by the values of the characteristic parameters a spatial area exists in which the signal error rate of the equalizer output is constant, that is, the change in the signal error rate is zero, and that the above-mentioned minute change area of the characteristic parameters is included in that spatial area, it will become impossible to converge the characteristic parameters to an optimum value. For example, in FIG. 8 the signal error rate of the equalizer output is shown by circular contour lines, and a region with a constant signal error rate of equalizer output "1" is shown by the hatched lines. Thus, in a two-dimensional plane that can be occupied by the equalizer characteristic parameters $C_1$ and $C_2$, the above-mentioned characteristic values cannot be controlled in a direction approaching an optimum value, even when the signal error rate is detected at each of measurement points $P_1$, $P_2$, $P_3$, and $P_4$ in the above region with changed characteristic parameters, because the change in the signal error rate is always "0".

With the automatic equalizer with variable characteristic parameters according to an embodiment of the present invention, initial parameters are afforded by an initial parameter setting unit to variably control the characteristic parameters. For each of the measurement points, corresponding to a plurality of previously set characteristic values, the above-mentioned parameter setting unit sequentially detects the signal error rate of the equalizer output by error rate detection to find a minimum error rate measurement point to provide the characteristic parameters of the detected measurement point to the equalizer as initial parameters.

The characteristic parameter control repeatedly performs a control operation of changing characteristic parameters of the equalizer within a predetermined range and variably controlling, on the basis of the degree of change of the signal error rate of the equalizer output detected by the error rate detection unit, the equalizer characteristic parameters in a direction to diminish the signal error rate.

Figure 9:
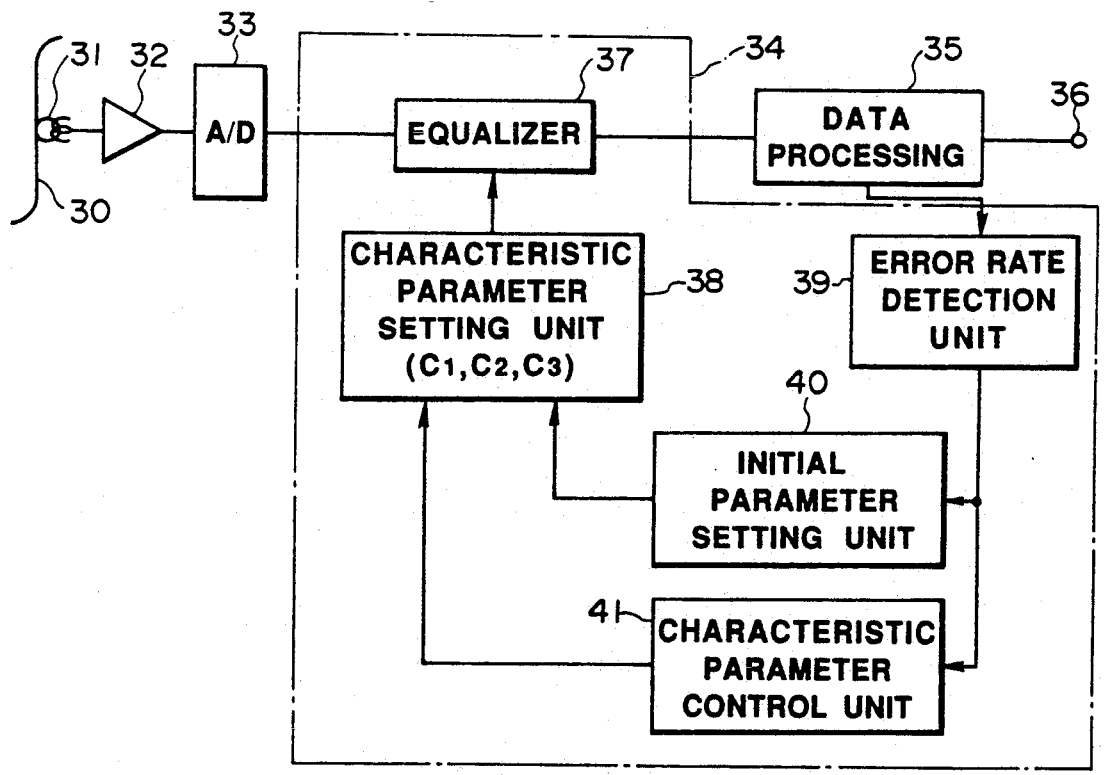
FIG. 9 is a schematic in block diagram form of a second embodiment of an automatic equalizer according to the present invention applied to a digital audio tape recorder.

FIG. 9 is a block diagram of a playback system of a digital audio tape recorder employing an automatic equalizer according to another embodiment of the present invention. The playback system of FIG. 9 includes a magnetic head 31 for reproducing digital audio data recorded on a magnetic tape 30, and the playback signal is supplied to an analog-to-digital (A/D) converter 33 through a playback amplifier 32. A/D converter 33 converts the playback signal into binary values and thence into a corresponding digital signal. The digital signal obtained by A/D converter 33 is supplied by way of equalizer 37 to data processing unit 35, which performs prescribed error correction or decoding operations on the digital signal supplied over equalizer 37. Data processing unit 35 decodes digital audio data from the digital signal to produce output decoded data as playback audio data at output terminal 36.

In the playback system automatic equalizer 34 includes an equalizer 37 that has variable equalizer characteristics by virtue of the three characteristic parameters $C_1$, $C_2$, and $C_3$ supplied from a characteristic parameter setting unit 38. The specific construction of equalizer 37 is similar to that of the equalizer shown in FIG. 6, that is, it is an FIR filter.

As shown in FIG. 9, automatic equalizer 34 also includes an error rate detection unit 39 for detecting a signal error rate of the output from equalizer 37, an initial parameter setting unit 40 for affording initial values for the parameter $C_1$ to $C_3$ of equalizer 37, or initial parameters to setting unit 38 on the basis of the signal error rate ER detected by error rate detection unit 39.

In the above-described automatic equalizer 34 of the characteristic parameters $C_1$ to $C_3$ afforded by parameter setting unit 38 to equalizer 37 the third parameter $C_3$ is always fixed at a predetermined level, while the first and the second parameters $C_1$ and $C_2$ are variable and can be set to provide an optimum equalizer output by equalizer 37.

Figure 10:
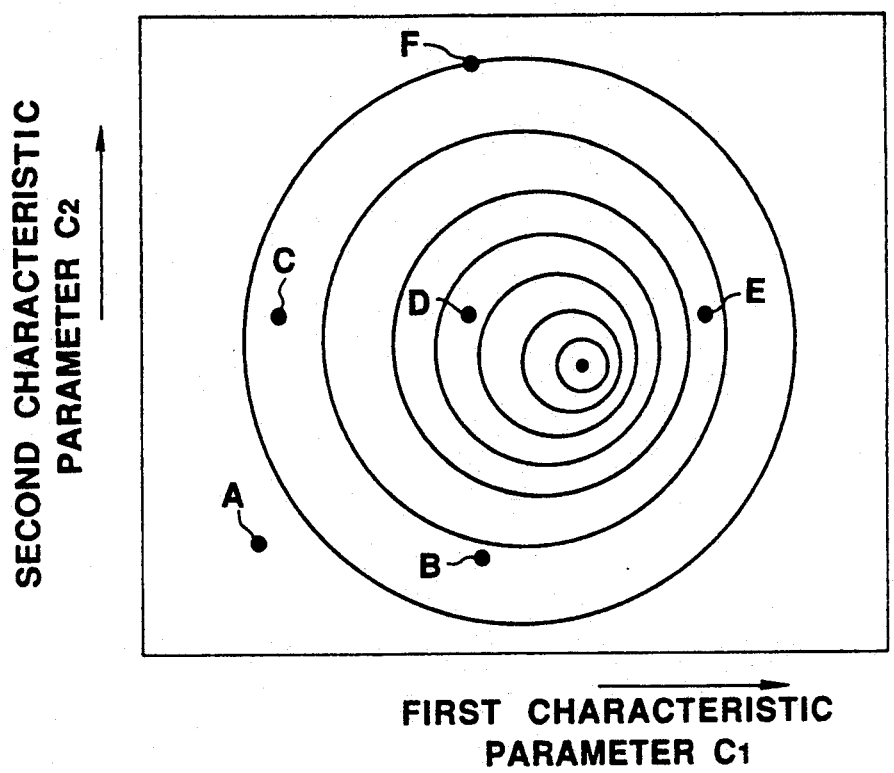
FIG. 10 graphically illustrates characteristic parameters useful in explaining the operation of the initial parameter setting unit of the automatic equalizer.
Figure 11:
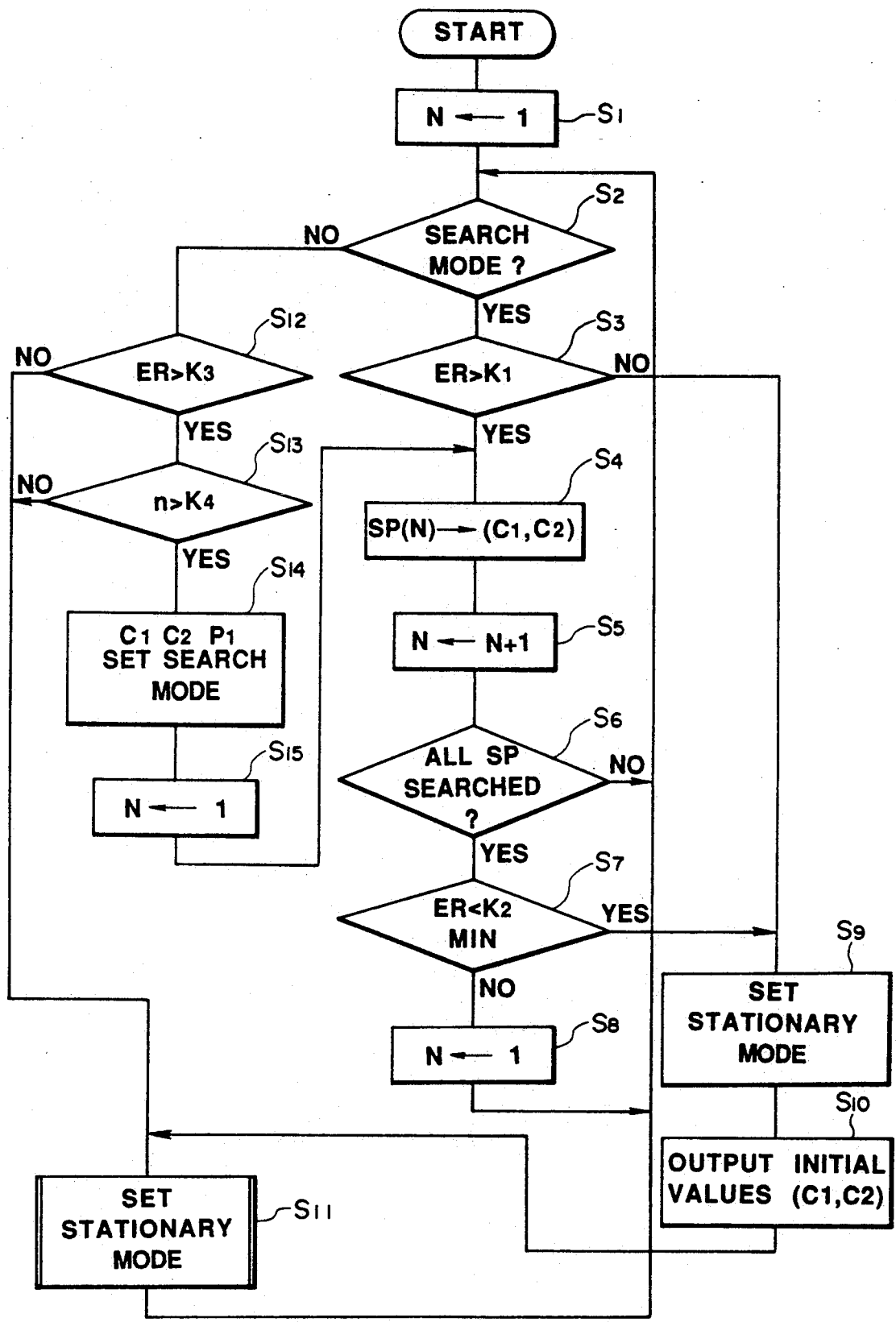
FIG. 11 is a flowchart useful in explaining the operation of the automatic equalizer.

Initial parameter setting unit 40 operates in a sequential fashion as shown in the flow chart of FIG. 11. The setting operation may be thought of as occurring in a two-dimensional plane that can be occupied by first and second characteristic parameters $C_1$ and $C_2$ of equalizer 37 and in which the signal error rates ER of the output of equalizer 37 are sequentially detected by error rate detection unit 39 at a required minimum number of present measurement points A, B, C, D, E, and F, which are thought to be excellent as initial values of the characteristic parameters $C_1$ and $C_2$. This is depicted in FIG. 10. Thus, this operation is to find a measurement point of the minimum error rate $ER_{MIN}$ for affording the characteristic parameters $C_1$, $C_2$ of the thus found measurement point to characteristic parameter setting unit 38 as initial parameters.

On starting the operation of automatic equalizer 34, initial parameter setting unit 40 sets a variable N, which counts the number of the measurement points A, B, C, D, E, and F equal to 1 at first step $S_1$ and then proceeds to step $S_2$.

In second step $S_2$ it is determined whether the mode is the search mode for setting the initial parameter. If the result is NO, that is, if the mode is not the search mode, the method proceeds to a subsequent step $S_{12}$. If the result of the decision at step $S_1$ is YES, that is, if the mode is the search mode, the operation proceeds to the next step $S_3$.

On starting the operation of the automatic equalizer 34, the above-mentioned search mode is set, and the operation proceeds from the second step $S_2$ to the third step $S_3$, in which it is determined whether the signal error rate ER of the output of equalizer 37 currently detected by error rate detection unit 39 is larger than a predetermined value $k_1$. If the result of the decision at the third step $S_3$ is NO, that is, if the signal error rate ER is smaller than the predetermined value $k_1$, the method proceeds to subsequent step $S_9$. If the result of the decision at step $S_3$ is YES, that is, if the signal error rate ER is larger than the predetermined value $k_1$, the operation proceeds to step $S_4$.

In this fourth step $S_4$, the characteristic parameters $C_1$ and $C_2$ at the first measurement point A, indicated by the variable N (N=1), are afforded to the parameter setting section 11, and the signal error rate ER of the output of equalizer 37 is detected by error rate detection unit 39. In step $S_5$ the variable N is incremented by one, after which the operation method to step $S_6$.

At step $S_6$, it is determined if the signal error rate ER has been detected for all of the measurement points A to F. If the result of the decision at step $S_6$ is NO, the operation reverts to the second step $S_2$ to repeat the operation from step $S_2$ to step $S_6$. In this manner, the signal error rate ER detected for the measurement points A to F in that order. If the result of the decision at the sixth step $S_6$ is YES, that is if the signal error rate ER has been detected for all of the measurement points ER, the operation proceeds to the next step $S_7$.

At this seventh step $S_7$, it is determined whether the minimum value $ER_{MIM}$ of the signal error rates detected for the measurement points A to F is smaller than the predetermined value $k_2$. If the result of the decision at the seventh step $S_7$ is NO, that is, if the minimum error rate value $ER_{MIM}$ smaller than the predetermined value $k_2$ cannot be obtained, it is concluded that the detection of the signal error rates ER for the measurement points A to F by the processing operation from the second step $S_2$ to the sixth step $S_6$ has resulted in failure. Thus, at step $S_8$, the variable N is set back to 1 and the program reverts to the second step $S_2$ to repeat the operation of detecting the signal error rate ER. If a result of the decision at the seventh step $S_7$ is YES, that is, if the minimum error rate $ER_{MIM}$ smaller than the predetermined value $k_2$ is found, the operation proceeds to the ninth step $S_9$. At this ninth step $S_9$, a stationary mode is set as the operating mode of automatic equalizer 34. At the next step $S_{10}$, the initial parameters having as values the values of the characteristic parameters $C_1$ and $C_2$ for the measurement point for which the minimum error rate $ER_{MIM}$ has been obtained by the search mode operation, for example, the fourth measurement point D shown in FIG. 10, are provided to characteristic parameter setting section 38.

After providing the initial parameters to parameter setting unit 38, initial parameter setting unit 40 causes control of parameter setting section 38 to be taken over by parameter control unit 41.

If the result of the decision at the third step $S_3$ is NO, that is, if the measurement point is one for which the signal error rate ER becomes smaller than the predetermined value $k_1$, initial parameter setting unit 40 proceeds to step $S_9$ to set the stationary mode. At the tenth step $S_{10}$, the initial parameters having the values of the characteristic parameters $C_1$ and $C_2$ at the measurement points for which the signal error rate ER detected by the decision operation at the third step $S_3$ becomes smaller than the predetermined value $k_1$ are provided to characteristic parameter setting unit 38. In this manner, at a time when a measurement point has been found for which the signal error rate ER is smaller than the predetermined value $K_1$, initial parameters having the values of the characteristic parameters $C_1$ and $C_2$ for the measurement point are set as the initial values to expedite the operation for the search mode.

Figure 12:
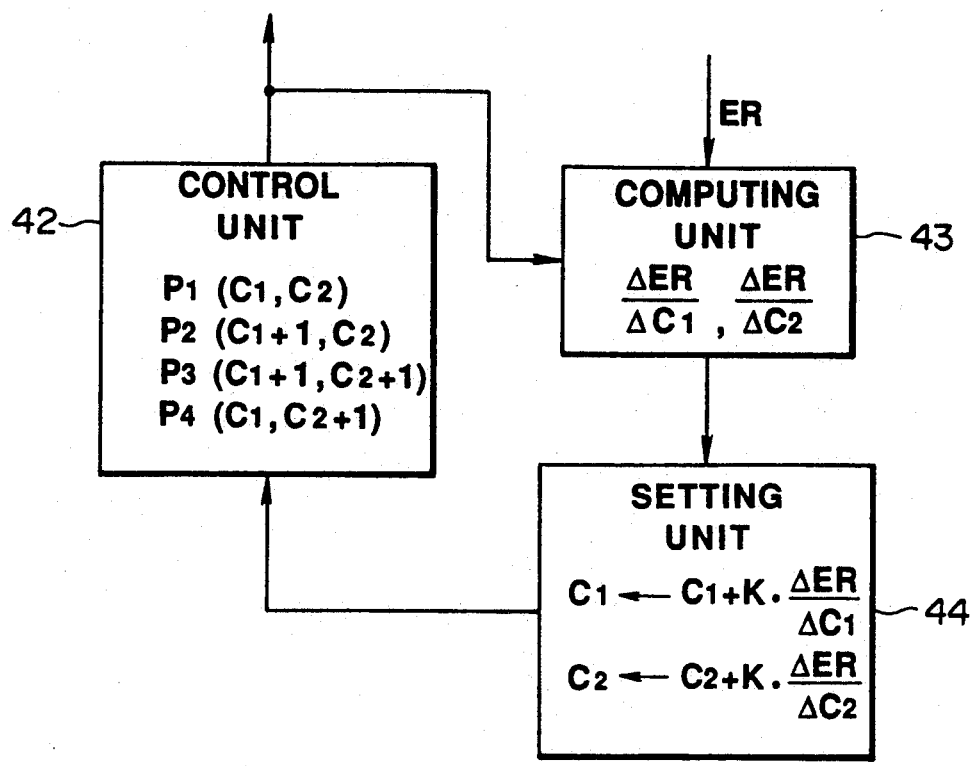
FIG. 12 is a block diagram of a functional example of the characteristic parameter control unit of the automatic equalizer.

Characteristic parameter control unit 41 performs the stationary mode control operation at step $S_{11}$ and is organized as shown for example in FIG. 12 including a control unit 42 for sequentially changing the characteristic parameter $C_1$ and $C_2$ provided by parameter setting unit 38 to equalizer 37 at a predetermined short time interval within a predetermined minute range. Characteristic parameter control unit 41 also includes a computing unit 43 for computing the degree of change of the signal error rate ER detected by error rate detection unit 39, and a setting unit 44 for setting the characteristic parameters $C_1$ and $C_2$ of equalizer 37 in the direction of decreasing error rate ER based on the degree of change of the error rate ER computed by a computing unit 43.

Figure 13:
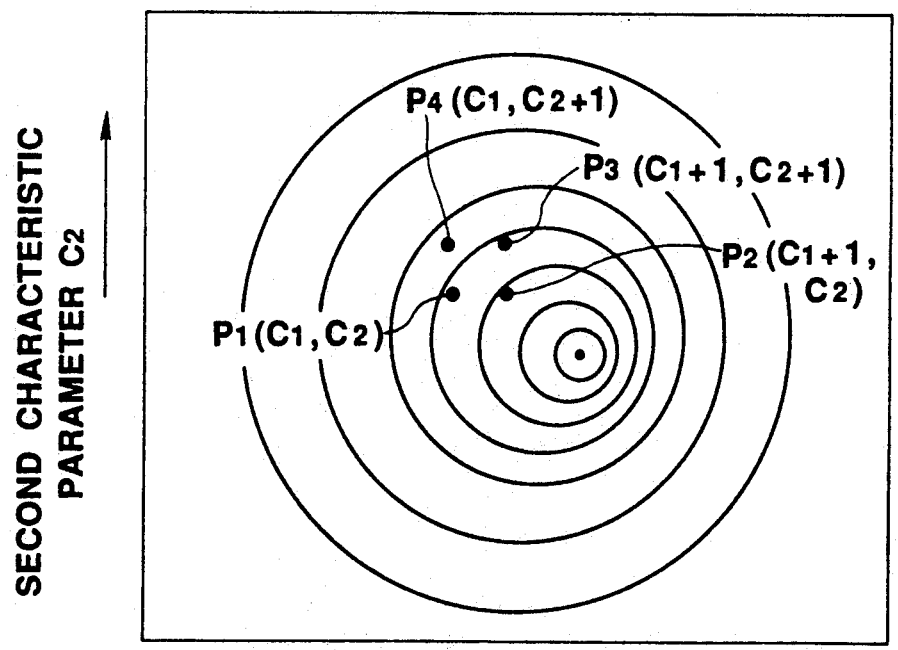
FIG. 13 graphically illustrates parameters useful in explaining the control operation by the characteristic parameter control unit.

Control unit 42 performs its control operation by minutely orthogonally oscillating the values of the characteristic parameters $C_1$ and $C_2$ in the sequence of $P_1(C_1,C_2)$ $P_2(C_1+1,C_2)$ $P_3(C_1+1,C_2+1)$ $P_4(C_1,C_2+1)$, as shown in FIG. 13, in a two-dimensional plane that can be occupied by the values of the characteristic parameters $C_1$ and $C_2$ provided by characteristic parameter setting unit 38 to equalizer 37.

Computing unit 43 operates on the output from equalizer 37 for the characteristic parameters of the values $P_1(C_1,C_2)$, $P_2(C_1+1,C_2)$, $P_3(C_1+1,C_2+1)$, and $P_4(C_1,C_2+1)$ to compute the degree of change $\Delta ER/\Delta C_1$ of the error rate variance $\Delta ER$ with respect to the variance $\Delta C_1$ of the first parameter $C_1$, in accordance with:

$$\Delta ER/\Delta C_1 = \{(ER_2+ER_3)-(ER_1+ER_1)\}/2 \quad (5)$$

while simultaneously computing the degree of change $\Delta ER/\Delta C_2$ of the variance $\Delta ER$ of the error rate ER with respect to the variances $\Delta C_2$ of the second characteristic parameter $C_2$, in accordance with:

$$\Delta ER/\Delta C_2 = \{(ER_3+ER_4)-(ER_1+ER_2)\}/2 \quad (6)$$

The data of the degrees of change $\Delta ER/\Delta C_1$, $\Delta ER/\Delta C_2$ of the variance $\Delta ER$ of the error rate ER with respect to the variances $\Delta C1$, $\Delta C2$ of the characteristic parameters $C_1$, $C_2$ computed by computing unit 43 are supplied to parameter setting unit 44.

On the basis of the ratio data $\Delta ER/\Delta C_1$, $\Delta ER/\Delta C_2$ of the variance $\Delta ER$ of the above-mentioned characteristic parameters $C_1$ and $C_2$, parameter setting unit 44 sets the new values of the characteristic parameters $C_1$, $C_2$ in the following manner to diminish the error rate ER.

Setting unit 44 sets a new value of the first characteristic parameter $C_1$ to:

$$C_1 + K \cdot \frac{\Delta ER}{\Delta C_1}$$

which is the value of the preceding first characteristic parameter $C_1$ added to a correction value $K\Delta ER/\Delta C_1$. The setting section 44 also sets a new value of the second characteristic parameter $C_2$ to:

$$C_2 + K \cdot \frac{\Delta ER}{\Delta C_2}$$

which is the value of the preceding second characteristic parameter $C_2$ added to a correction value $K\Delta ER/\Delta C2$. In the above formulae, K stands for a constant.

The setting operation of the new characteristic parameters $C_1$ and $C_2$ by setting unit 44 need not necessarily be a linear operation but may also be a nonlinear operation, if the error rate ER can be reduced effectively.

The new characteristic parameters $C_1$ and $C_2$ set by parameter setting unit 44 are fed to control unit 42, which then repeatedly performs the control operation of minutely orthogonally oscillating these new characteristic parameters $C_1$ and $C_2$.

In this manner, characteristic parameter control unit 41 of FIG. 9 causes the characteristic parameters $C_1$ and $C_2$ of equalizer 37 to be changed within a predetermined range and, on the bases of the extent of the variance $\Delta ER$ of the signal error rate ER detected by error rate detection unit 39, repeatedly performs an operation of variably controlling the characteristic parameters $C_1$ and $C_2$ of equalizer 37 in the direction to diminish the error rate ER, thereby automatically controlling the characteristic parameters $C_1$ and $C_2$ of equalizer 37 to minimum signal error rate ER.

Characteristic parameter control unit 41 performs a control operation for the characteristic parameters $C_1$ and $C_2$ using as initial values the characteristic parameters $C_1$ and $C_2$ for the fourth measurement point D, provided as the initial parameters by initial parameter setting unit 40. In this manner, the characteristic parameters $C_1$, $C_2$ can be converged to optimum values promptly and reliably.

In the present embodiment, the operation reverts to the above-mentioned second step $S_2$ each time characteristic parameter control unit 41 performs a control operation for the characteristic parameters $C_1$, $C_2$, that is, the control operation of the stationary mode of the eleventh step $S_{11}$, while reverting to the twelfth step $S_{12}$ from the second step $S_2$ during the control operation of the stationary mode, in order to decide if the signal error rate ER obtained by error detection unit 39 is larger than a predetermined value $k_3$.

If the result of the decision at the twelfth step $S_{12}$ is NO, that is, if the signal error rate ER is less than the value $k_3$, the operation reverts to the eleventh step $S_{12}$ to repeat the stationary mode control operation.

If the result of the decision at the twelfth step $S_{12}$ is YES, that is, if the error rate ER is larger than the predetermined value $k_3$, the operation proceeds to the thirteenth step $S_{13}$. In this thirteenth step $S_{13}$, it is determined whether the number of times the error signal rate ER is larger than the predetermined value $k_3$ is larger than a predetermined value $k_4$. If the result of the decision at step $S_{13}$ is NO, the operation reverts to the eleventh step $S_{11}$ to repeat the stationary mode control operation. If the result of the decision at the step $S_{13}$ is YES, that is, if the state in which the signal error rate ER is larger than the predetermined value k3 occurs consecutively a predetermined number of times $k_4$, the program proceeds to the fourteenth step $S_{14}$ for setting the measurement point $P_0$ indicated by the characteristic parameters $C_1$ and $C_2$ at this time as the even-numbered-multiple measurement point, while simultaneously setting the search mode.

After setting the variable N equal to 1 at the next step $S_{15}$, the operation reverts to the above-mentioned fourth step $S_4$ to proceed to the search mode as described above.

When the state in which the signal error rate ER is larger than the predetermined value $k_3$ occurs consecutively a predetermined number of times $k_4$ during the above-mentioned ordinary operational mode, and the mode shifts to the search mode, the processing operation step $S_2$ to step $S_6$ is repeated, and each signal error rate ER is sequentially detected for each of the measurement points $P_0$ set at step $S_{14}$ and the preset measurement point $P_0$ set at the step $S_{14}$ and the preset measurement points A to F, in the order of A→P₀→B→P₀→C→P₀→D→P₀→E→P₀→F, for performing the search operation as described above.

After setting the new initial parameter at the tenth step $S_{10}$ following the search operation, the program reverts to the eleventh step $S_{11}$ to reinitiate the control operation for the stationary mode.

If the signal error rate ER of the measurement point $P_0$ is equal to the minimum error rate $ER_{MIN}$ of the measurement points A to F, the characteristic parameters $C_1$ and $C_2$ of the measurement point $P_0$ are preferentially set as the above-mentioned initial parameters. The decision values $k_1$, $k_2$, and $k_3$ of the signal error rate ER at the steps $S_2$, $S_7$, and $S_{12}$ are set so that the relation $$k_1 < k_2 < k_3 \text{ or } k_1 < k_3 < k_2$$

is satisfied.

With the above-described embodiment of the automatic equalizer according to the present invention, the characteristic parameters of that measurement point, from among those corresponding to several preset characteristic parameters, that gives the smallest signal error rate, are provided as the initial parameters by the initial parameter setting unit to the equalizer that has variable characteristic parameters. In this way the control operation of converging the characteristic parameters of the equalizer to an optimum value by the characteristic parameter control unit may be started at a point closer to the above-mentioned optimum value. Also, because the initial parameter setting unit detects the signal error rate of the equalizer output for each of the measurement points corresponding to the several characteristic parameters, initial parameters can be set that will allow the characteristic parameters to be converged more efficiently and reliably to an optimum value by the parameter control unit. In this manner, the characteristic parameters can be converged to their optimum values efficiently and reliably by the above characteristic parameter control unit.

In addition, the initial parameter setting unit provides as the initial parameter a measurement point that is not higher than the preset signal error rate to the equalizer at the time when such measurement point is found, so that the initial parameter setting operation may be performed expeditiously. Also, when the signal error rate of the equalizer exceeds a preset signal error rate during the characteristic parameter control operation by the parameter control unit, the initial parameter setting unit performs the operation of setting the initial parameters using the characteristic parameters in this state as one of the several measurement points, so that the initial parameter setting operation may be performed expeditiously.

In this manner, there is provided an automatic equalizer in which the characteristic parameters of the equalizer may be converged efficiently and reliably to optimum values to afford the optimum equalizer characteristic to input signals.

Meanwhile, in a signal reproducing apparatus in which signal reproduction is performed without tracking control, as disclosed in the above identified Japanese Patent Application No. 59-177712 (1984), for example, each track of the magnetic tape is traced completely by alternately tracing the track with two magnetic heads, so that the track-tracing correlation exhibits a two-tracing-per-track periodicity. Thus, the track-tracing correlation remains constant between every other head-tracing but differs between every two consecutive head-tracings.

Thus, when applying the automatic equalizer to the reproducing apparatus, it is necessary to separately perform the measurement of the effect of the characteristic parameters of the equalizer at the odd-number multiple tracing and at the even-number multiple tracing, so that the overall system becomes complex and bulky and the cost, weight, and power consumption are all also increased.

The present invention teaches to apply the above-described automatic equalizer to the signal reproducing apparatus without tracking control to simplify the overall system while reducing its weight, cost, and power consumption. More specifically, this embodiment of the invention is directed to signal reproducing apparatus having an automatic equalizing function for efficiently extracting changes in the degree of effect of the characteristic parameters of the equalizer in an odd-number multiple tracing and in an even-number-multiple tracing.

With the signal reproducing apparatus of the present invention, reproduction outputs from the first and second playback rotary magnetic heads are converted to binary form and equalizer characteristics are provided for the binary output by an equalizer having variable characteristic parameters, with the equalized output from the equalizer being then decoded into digital signals.

The error detection unit detects the signal error rate of the decoded output, which is the digital signal obtained upon decoding.

The characteristic parameter control unit repeats a control operation of orthogonally allocating the characteristic parameters of the equalizer, which eliminates the effect due to the tracing sequence by the first and second magnetic heads, by minutely changing these parameters within a predetermined range and variably adjusting the equalizer parameters in the direction of reducing the signal error rate based on the degree of change of the signal error rate as detected by the error rate detection unit.

Figure 1:
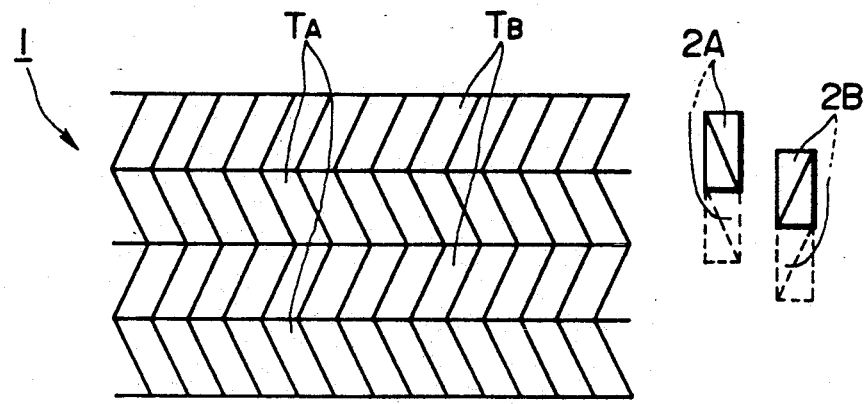
FIG. 1 is a pictorial representation of the relation between the recording tracks and the reproducing magnetic heads in a digital audio tape recorder of the so-called inclined azimuth recording kind.
Figure 2:
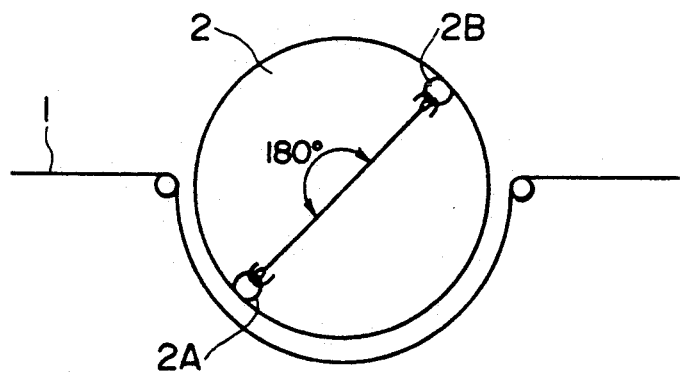
FIG. 2 is a diagrammatic plan view showing the construction of a rotary magnetic head device employed in the digital audio tape recorder of FIG. 1.
Figure 3:
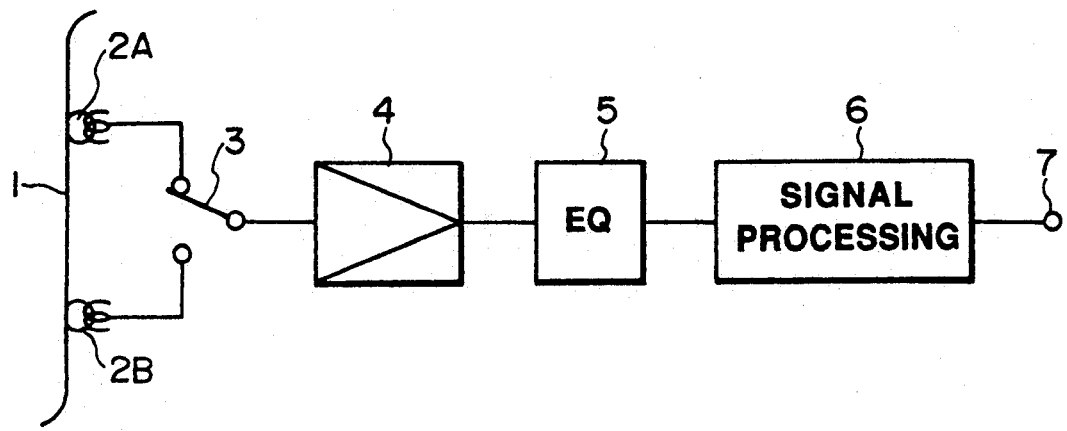
FIG. 3 is a schematic in block diagram form of the signal path of a conventional digital audio tape recorder.
Figure 4:
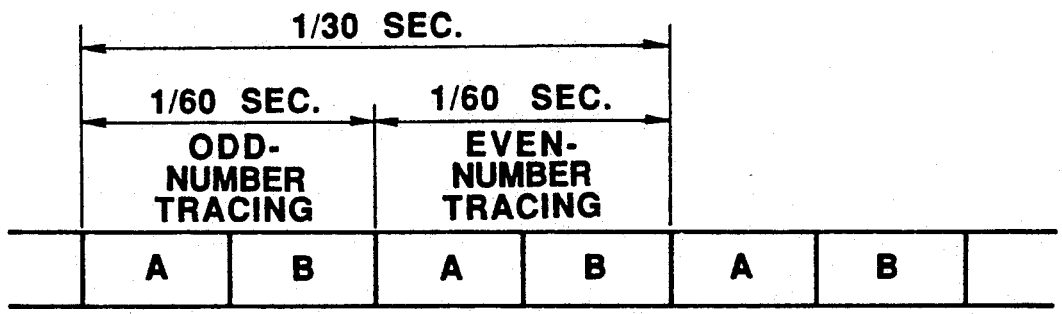
FIG. 4 is a representation of the reproduced output signals from the reproducing magnetic heads in the digital audio tape recorder of FIG. 3.
Figure 14:
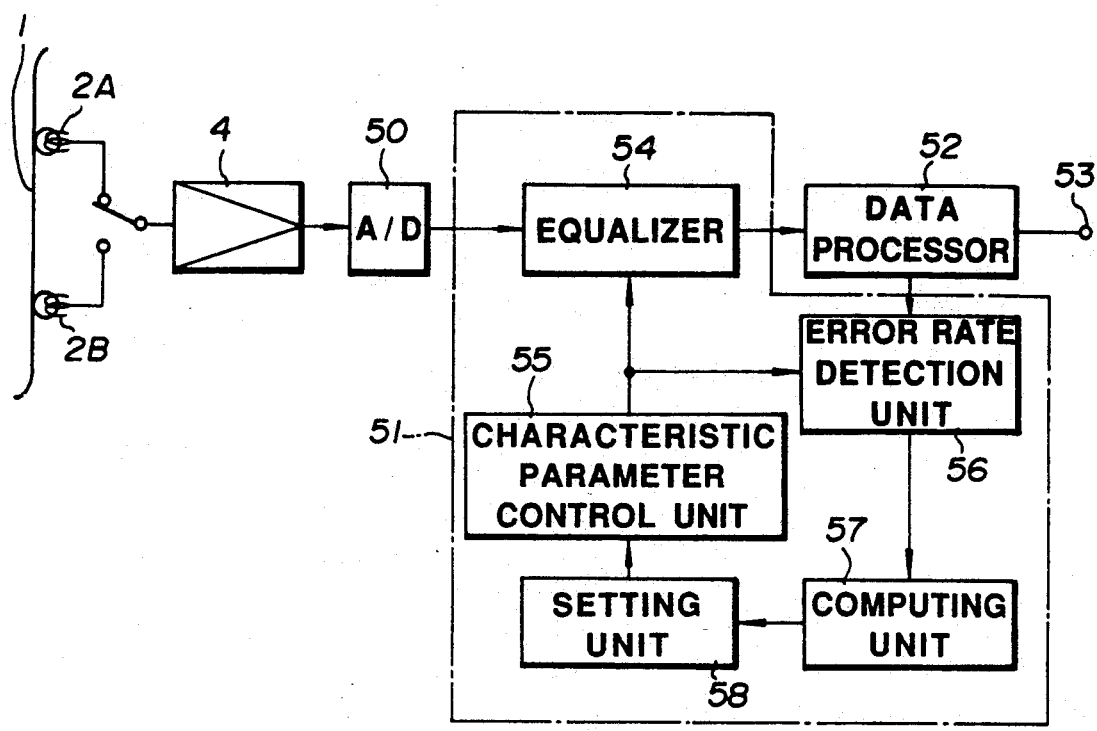
FIG. 14 is a schematic in block diagram form of a reproducing system of a digital audio tape recorder to which the present invention is applied.

FIG. 14 is a block diagram showing the construction of a reproducing system of a digital audio tape recorder according to an embodiment of the present invention. The reproducing system, in which the present invention is applied performs signal reproduction without tracking control, as in the manner described in relation to FIGS. 1 to 4, includes a rotary magnetic head assembly having first and second rotational reproducing rotary magnetic heads 2A, 2B mounted on a tape guide drum 2 at an angular interval of 180° from each other, as shown in FIG. 2. Each of the magnetic heads has an azimuth angle corresponding to the recording azimuth of first and second inclined tracks $TR_A$, $TR_B$ formed alternately on the magnetic tape 1 as shown in FIG. 1. Each track of the magnetic tape 1, wound on tape guide drum 2 over an angle of 180° is traced completely only after it has been traced alternately a number of times, for example twice, by first and second rotational reproducing magnetic heads 2A, 2B.

The playback signals reproduced by playback heads 2A, 2B are fed from a head changeover switch 3 via a playback amplifier to an analog-to-digital (A/D) converter 50. A/D converter 50 converts the playback signal into binary signals and thence into corresponding digital signals. The digital signals from the A/D converter 50 are supplied via an automatic equalizer 51 to a data processor 52 that performs predetermined error correction and decoding operations on the digital signals supplied from automatic 51. In this manner, digital processor 52 decodes the digital audio data from the digital signals to output decoded data as playback audio data at an output terminal 53.

In the above-described reproducing system, automatic equalizer 51 is comprised of an equalizer 54, and is organized substantially as shown in FIG. 6. Equalizer 54 has its equalizer characteristics varied by three characteristic parameters $C_1$, $C_2$, and $C_3$ that are provided by a characteristic parameter control unit 55. Automatic equalizer 51 also includes an error rate detection unit 56 for detecting the signal error rate ER of the output of equalizer 54, a computing unit 57 for computing the extent of change of the signal error rate ER detected by error rate detection unit 56, and a setting unit 58 for setting the characteristic parameters $C_1$ and $C_2$ of the equalizer 54, in the direction to diminish the signal error rate ER based on the extent of change of the signal error rate ER computed by unit 57.

Of the parameters $C_1$, $C_2$, and $C_3$ provided by parameter control unit 55 to equalizer 54, the third characteristic parameter $C_3$ is always fixed at a predetermined value, while the first and second parameters $C_1$ and $C_2$ are variably set, so that optimum equalizer characteristics are afforded by equalizer 54.

Figure 15:
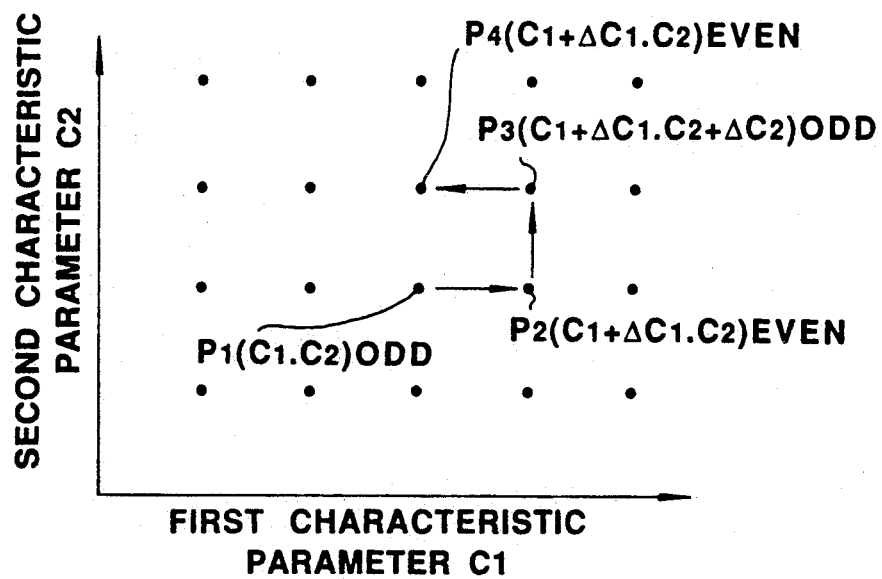
FIG. 15 graphically illustrates characteristic parameters useful in explaining the operation of the automatic equalizer used in the reproducing system of FIG. 14.

Characteristic parameter control unit 55 performs, in a two-dimensional plane that can be occupied by the characteristic parameters $C_1$ and $C_2$ afforded by equalizer 54, a control operation as shown in FIG. 15 of producing a minute orthogonal oscillation in the sequence of:

$P_1(C_1, C_2)$ODD $P_2(C_1+\Delta C_1, C_2)$EVEN $P_3(C_1+C_1, C_2+\Delta C_2)$ODD $P_4(C_1, C_2+\Delta C_2)$EVEN That is, in the sequence in which the values of the characteristic parameters $C_1$ and $C_2$ are $P_1(C_1, C_2)$ODD, $P_2(C_1+\Delta C_1, C_2)$EVEN, $P_3(C_1+\Delta C_1, C_2)$ ODD and $P_4(C_1, C_2\Delta C_2)$EVEN for the first odd-number-multiple tracing, the next even-number-multiple tracing, the next odd-number multiple tracing and the next even-number-multiple tracing, respectively.

The computing section 57 operates on the output of equalizer 54 for the characteristic parameters having the values of $P_1(C_1, C_2)$ODD, $P_2(C_1+\Delta C_1, C_2+\Delta C2)$ODD, and $P_4(C_1, \Delta C_2+\Delta C_2)_{ODD}$, and $P_4(C_1, C_2)$EVEN to compute the change ratio $\Delta ER/\Delta C_1$ of the variance $\Delta ER$ of the error rate ER to the variance $\Delta C_1$ of the first characteristic parameter $C_1$ from the signal error rates $ER_1$, $ER_2$, $ER_3$, and $ER_4$ detected by error rate detection unit 56, in accordance with equation (7).

$$(\Delta ER/\Delta C_1) = ((ER_2+ER_3)-(ER_4+ER_1))/2 \quad (7)$$

while computing the change ratio $\Delta ER/\Delta C_2$ of the variance $\Delta ER$ of the error rate ER to the variance $\Delta C_2$ of the second characteristic parameter, $C_2$, in accordance with equation (8).

$$\Delta ER/\Delta C_2 = \{(ER_3+ER_4)-(ER_1+ER_2)\}/2 \quad (8)$$

In the above-mentioned reproducing apparatus, characteristic parameter control unit 55 performs a control operation of allocating the characteristic parameters $C_1$ and $C_2$ applied to equalizer 54, in the sequence not affected by the tracing sequence by the first orthogonal relation as shown in Table 1, and minutely changing these parameters in a predetermined range to compute the change ratios $\Delta ER/\Delta C_1$ and $\Delta ER/\Delta C_2$ of the variance $\Delta ER$ of the error rate ER to the variance $\Delta C_1$, $\Delta C_2$ of the characteristic parameters.

TABLE 1

| | \multicolumn{4}{c}{Orthogonal Allocation for Two-Parameters} |
|---|---|---|---|---|
| | $C_1$ | $C_2$ | tracing | signal error rate |
| $P_1$ | 0 | 0 | ODD | $ER_1$ |
| $P_2$ | 1 | 0 | EVEN | $ER_2$ |
| $P_3$ | 1 | 1 | ODD | $ER_3$ |
| $P_4$ | 0 | 1 | EVEN | $ER_4$ |

By cycling the minute changes of characteristic parameters $C_1$ and $C_2$ in an orthogonal relation as shown in Table 1, it becomes possible to compute at error rate detection unit 56 the ratios $\Delta ER/C_1$ and $\Delta ER/\Delta C_2$ of the variance $\Delta ER$ of the error rate ER to the variances $\Delta C_1$ and $\Delta C_2$ of the parameters $C_1$ and $C_2$ by equations (7) and (8) under conditions that are less affected by the even-number-multiple tracing or odd-number-multiple tracing.

It is noted that the respective ratios $\Delta ER/\Delta C_1$ and $\Delta ER/\Delta C_2$ of the variance $\Delta ER$ to the variances $\Delta C_1$ and $\Delta C_2$ of the characteristic parameters $C_1$ and $C_2$ can be computed in accordance with the following equations (9) and (10):

$$ER/\Delta C_1 = ER_2 - ER_1 \quad (9)$$

$$ER/\Delta C_2 = ER_4 - ER_1 \quad (10)$$

, without requiring the signal error rate ER3. Nevertheless, computing the ratios $\Delta ER/\Delta C_1$ and $\Delta ER/\Delta C_2$ as mean values of each two measurements by equations (7) and (8) and using the signal error rates $ER_1$, $ER_2$, $ER_3$, and $ER_4$, it becomes possible to reduce the effects by the accidental errors as compared to the case when computing the ratios by equations (9) and (10). Also, by employing the orthogonal allocation shown in Table 1, it becomes possible to offset the effects by the variances $\Delta C_2$ and $\Delta C_1$ when measuring the effect of the variances $\Delta C_1$ and $\Delta C_2$, respectively, so that the effect by the variances $\Delta C_1$ and $\Delta C_2$ of the characteristic parameters $C_1$ and $C_2$ can be detected quite accurately.

The data of the ratio $\Delta ER/\Delta C_1$ and $\Delta ER/\Delta C_2$ of the variance $\Delta ER$ of the error rate ER to the variances $\Delta C_1$, $\Delta C_2$ of the parameters $C_1$, $C_2$ computed by computing unit 57 are provided to parameter setting unit 58.

On the basis of the ratio data $\Delta ER/\Delta C_1$, $\Delta ER/\Delta C_2$ of the variance $\Delta ER$ of the error rate ER to the variances $\Delta C_1$, $\Delta C_2$ of the above-mentioned characteristic parameters $C_1$ and $C_2$, setting unit 58 sets the new values of the characteristic parameters $C_1$, $C_2$ in the following manner to diminish the error rate ER.

Thus, parameter setting unit 58 sets a new value of the first characteristic parameter $C_1$ to:

$$C_1 + K \cdot \frac{\Delta ER}{\Delta C_1}$$

, which is the value of the preceding first characteristic parameter $C_1$ added to a correction value $K\Delta ER/\Delta C_1$. Parameter setting section unit 58 also sets a new value of the second characteristic parameter $C_2$ to:

$$C_1 + K \cdot \frac{\Delta ER}{\Delta C_2}$$

, which is the value of the preceding second characteristic parameter $C_2$ added to a correction value $K \Delta ER/\Delta C_2$. In the above formulae, K stands for a constant.

The parameter setting operation of the new characteristic parameters $C_1$ and $C_2$ by parameter setting unit 58 need not necessarily be a linear operation, but may also be a nonlinear operation, provided that the error rate ER can thereby be reduced effectively.

The new characteristic parameters $C_1$ and $C_2$ thus set by setting unit 58 are provided to control unit 55, which then repeatedly performs the control operation of minute orthogonal oscillation of these new characteristic parameter $C_1$ and $C_2$, as described hereinabove.

In this manner, characteristic parameter control unit 55 causes the characteristic parameters $C_1$ and $C_2$ of the equalizer 54 to be changed within a predetermined range and, on the basis of the extent of the variance $\Delta ER$ of the signal error rate ER detected by error rate detection unit 56, repeatedly performs the operation of variably controlling the characteristic parameters $C_1$ and $C_2$ of equalizer 37 in the direction to reduce the error rate ER for automatically controlling the characteristic parameters $C_1$ and $C_2$ of equalizer 54 to the state of the minimum signal error rate ER.

In the above-described embodiment, the characteristic parameters $C_1$ and $C_2$ of equalizer 54 are changed to effect a control toward optimum values. Nevertheless, in reproducing apparatus of the present invention, the number of the characteristic parameters of the equalizer to be changed need not be limited to two as in the present embodiment. For example, when three characteristic parameters $C_1$, $C_2$, and $C_3$ are to be changed, these parameters are allocated in an orthogonal relation as shown in Table 2 to measure the signal error rates $ER_1$, $ER_2$, $ER_3$ and $ER_4$.

TABLE 2

| Orthogonal Allocation for Three Parameters | | | |
|---|---|---|---|
| | $C_1$ | $C_2$ | $C_3$ | signal error rates |
| $P_1$ | 0 | 0 | 0 | $ER_1$ |
| $P_2$ | 1 | 0 | 1 | $ER_2$ |
| $P_3$ | 1 | 1 | 0 | $ER_3$ |
| $P_4$ | 0 | 1 | 1 | $ER_4$ |

Then, the degress of the effect on $\Delta ER/\Delta C_1$ and $\Delta ER/\Delta C_2$ by the variances $\Delta C_1$ and $\Delta C_2$ of the characteristic parameters $C_1$ and $C_2$ may be computed from the above equations (7) and (8), while the degree of the effect on $\Delta ER/\Delta C_3$ by the variances $\Delta C_3$ of the characteristic parameter $C_3$ may be computed by using equation (11):

$$\Delta ER/\Delta C_3 = \{(ER_2+ER_4)-(ER_1+ER_3)\}/2 \qquad (11)$$

When four to seven characteristic parameters are to be changed, these parameters are allocated in an orthogonal relation, as shown for example in Table 3, to compute the signal error rates $ER_1$, $ER_2$, $ER_3$, $ER_4$, $ER_5$, $ER_6$, and $ER_7$.

TABLE 3

| Orthogonal Allocation for 4 to 7 Parameters | | | | | | | |
|---|---|---|---|---|---|---|---|
| | $\Delta C_1$ | $\Delta C_2$ | $\Delta C_3$ | $\Delta C_4$ | $\Delta C_5$ | $\Delta C_6$ | $\Delta C_7$ | signal error rate |
| $P_1$ | 0 | 0 | 0 | 0 | 0 | 0 | 0 | $ER_1$ |
| $P_2$ | 0 | 0 | 0 | 1 | 1 | 1 | 1 | $ER_2$ |
| $P_3$ | 0 | 1 | 1 | 0 | 0 | 1 | 1 | $ER_3$ |
| $P_4$ | 0 | 1 | 1 | 1 | 1 | 0 | 0 | $ER_4$ |
| $P_5$ | 1 | 0 | 1 | 0 | 1 | 0 | 1 | $ER_5$ |
| $P_6$ | 1 | 0 | 1 | 1 | 0 | 1 | 0 | $ER_6$ |
| $P_7$ | 1 | 1 | 0 | 0 | 1 | 1 | 0 | $ER_7$ |
| $P_8$ | 1 | 1 | 0 | 1 | 0 | 0 | 1 | $ER_8$ |

On the basis of the measured results of the signal error rates $ER_1$, $ER_2$, $ER_3$, $ER_4$, $ER_5$, $ER_6$, and $ER_7$ the degrees of effect $\Delta ER/\Delta C_1$, $\Delta ER/\Delta C_2$, ..., $\Delta ER/\Delta C_7$ by the variances $\Delta C_1, \Delta C_2, \ldots, \Delta C_7$ of the characteristic parameters $C_1, C_2, \ldots, C_7$ may be computed by the following equations (12) to (18):

$$\Delta ER/\Delta C_1 = \{(ER_5+ER_6+ER_7+ER_8)-(ER_1+ER_2+ER_3+ER_4)\}/8 \qquad (12)$$

$$\Delta ER/\Delta C_2 = \{(ER_2+ER_4+ER_7+ER_8)-(ER_1+ER_2+ER_5+ER_6)\}/8 \qquad (13)$$

$$\Delta ER/\Delta C_3 = \{(ER_3+ER_4+ER_5+ER_6)-(ER_1+ER_2+ER_7+ER_8)\}/8 \qquad (14)$$

$$\Delta ER/\Delta C_4 = \{(ER_2+ER_4+ER_6+ER_8)-(ER_1+ER_3+ER_5+ER_7)\}/8 \qquad (15)$$

$$\Delta ER/\Delta C_5 = \{(ER_2+ER_4+ER_5+ER_7)-(ER_1+ER_3+ER_6+ER_8)\}/8 \qquad (16)$$

$$\Delta ER/\Delta C_6 = \{(ER_2+ER_3+ER_6+ER_7)-(ER_1+ER_4+ER_5+ER_8)\}/8 \qquad (17)$$

$$\Delta ER/\Delta C_7 = \{(ER_2+ER_3+ER_5+ER_8)-(ER_1+ER_4+ER_6+ER_7)\}/8 \qquad (18)$$

With the reproducing apparatus of the present invention, as described hereinabove, the characteristic parameter control unit repeatedly performs the control operation allocating the characteristic parameters of the equalizer in an orthogonal relation in a sequence not affected by the tracing sequence by the first and second rotational reproducing magnetic heads, minutely changing these parameters within a predetermined range and variably adjusting the characteristic parameters of the equalizer in the direction of diminishing the signal error rate on the basis of the changing degree of the signal error rate of the equalizer output detected by the error rate detecting unit, whereby the change in the effect of the characteristic parameters of the equalizer during odd-number-multiple tracing and even-number-multiple tracing may be extracted for efficiently and reliably converging the characteristic parameters to optimum values. The playback output from the first and second playback rotary magnetic heads are converted into binary signals, to which equalizer characteristics are afforded by the equalizer, and the equalized output from the equalizer is decoded by a decoding unit into digital signals, so that reproduced digital signals having a low signal error rate and superior quality may be produced.

Thus, the present invention provides a signal reproducing apparatus, which performs signal reproduction without tracking with an automatic equalizing function, whereby the changes in the effect of the characteristic parameters of the equalizer during even-number-multiple tracing and odd-number-multiple tracing are extracted efficiently, so that the overall system may be simplified in structure without increasing the weight, cost, or power consumption.

The above description of preferred embodiments is presented by way of example only and it will be apparent that many modifications and variations thereof could be effected by one skilled in the art without departing from the spirit and scope of the invention, which is to be determined by the appended claims.

What is claimed is:

1. A signal reproducing apparatus in which each of first and second inclined tracks formed with different recording azimuths on a recording tape is traced alternately by first and second reproducing rotational magnetic heads having azimuth angles corresponding to the recording azimuth to reproduce digital signals therefrom, the apparatus comprising:

converting means for converting the reproduced digital output from said first and second reproducing rotational magnetic heads into binary signals;

an equalizer supplied with a binary output from said converting means and having variable characteristic parameters;

decoding means for decoding an equalized output supplied thereto from said converting means via said equalizer into a digital signal;

error rate detection means for detecting a signal error rate of a decoder output from said decoding means; and characteristic parameter control means for repeatedly performing a control operation of allocating the characteristic parameters of said equalizer in an orthogonal relation in a sequence unaffected by the tracing sequence by said first and second rotational magnetic heads and incrementally changing the thus allocated characteristic parameters within a predetermined range, said control means including extraction means connected to receive said signal error rate and said characteristic parameters for extracting a ratio of a change in said signal error rate relative to a change in said characteristic parameters for variably controlling the characteristic parameters of said equalizer in the direction of diminishing said signal error rate on the basis of the extracted ratio of the degree of change of the signal error rate detected by said error rate detection means relative to the change of said characteristic parameters.

2. The signal reproducing apparatus according to claim 1 wherein said characteristic parameter control means includes a setting unit receiving the extracted ratio from said extraction means for changing said thus allocated characteristic parameters in response thereto.

* * * * *